US012757810B2

(12) United States Patent
Schroeder et al.

(10) Patent No.: US 12,757,810 B2
(45) Date of Patent: Oct. 13, 2026

(54) SYSTEM AND METHOD FOR CONTROLLING THE OPERATION OF AN AGRICULTURAL IMPLEMENT

(71) Applicant: CNH Industrial America LLC, New Holland, PA (US)

(72) Inventors: Brittany Schroeder, Bunker Hill, IN (US); Joshua D. Knoblauch, Lowpoint, IL (US)

(73) Assignee: CNH Industrial America LLC, New Holland, PA (US)

( * ) Notice: Subject to any disclaimer, the term of this patent is extended or adjusted under 35 U.S.C. 154(b) by 165 days.

(21) Appl. No.: 18/481,350

(22) Filed: Oct. 5, 2023

(65) Prior Publication Data

US 2025/0113754 A1 Apr. 10, 2025

(51) Int. Cl.

| | |
|---|---|
| ***A01B 63/28*** | (2006.01) |
| ***A01B 27/00*** | (2006.01) |
| ***A01B 63/24*** | (2006.01) |
| ***A01B 79/00*** | (2006.01) |

(52) U.S. Cl.

CPC ............ *A01B 63/28* (2013.01); *A01B 27/005* (2013.01); *A01B 63/245* (2013.01); *A01B 79/005* (2013.01)

(58) Field of Classification Search

CPC ..... A01B 63/28; A01B 27/005; A01B 63/245; A01B 79/005; A01B 49/027; A01B 63/30; A01B 49/065

See application file for complete search history.

(56) References Cited

U.S. PATENT DOCUMENTS

| | | | | |
|---|---|---|---|---|
| 6,612,381 | B2 * | 9/2003 | Powell | A01B 49/02 172/581 |
| 11,357,153 | B2 | 6/2022 | Foster et al. | |
| 11,497,154 | B1 * | 11/2022 | Lund | A01B 63/002 |
| 11,622,494 | B2 | 4/2023 | Arnett et al. | |
| 2014/0262370 | A1 * | 9/2014 | Kohn | A01B 63/24 172/140 |

(Continued)

FOREIGN PATENT DOCUMENTS

JP 2024033715 A * 3/2024

OTHER PUBLICATIONS

Machine translation of JP2024033715A (Year: 2024).*

(Continued)

*Primary Examiner* — Scott A Browne
*Assistant Examiner* — Jisun Choi
(74) *Attorney, Agent, or Firm* — Dority & Manning, P.A.

(57) ABSTRACT

A system for controlling the operation of an agricultural implement includes a leveling disk gang assembly including a plurality of leveling disk blades configured to rotate relative to the surface of the field. Additionally, the system includes an imaging device configured to generate data indicative of the sizes of soil clods. Furthermore, the system includes an actuator configured to adjust a position of the leveling disk gang assembly. Moreover, the system includes a computing system communicatively coupled to the imaging device. The computing system is configured to determine the sizes of the soil clods based on the data generated by the imaging device and control the operation of the actuator to adjust the position of the leveling disk gang assembly based on the determined sizes of the soil clods.

19 Claims, 6 Drawing Sheets

(56) References Cited

U.S. PATENT DOCUMENTS

| | | | | |
|---|---|---|---|---|
| 2015/0021059 | A1* | 1/2015 | Hennes | A01B 61/02 172/599 |
| 2020/0113123 | A1* | 4/2020 | Shearer | A01B 79/005 |
| 2021/0007266 | A1 | 1/2021 | Stoller et al. | |
| 2021/0136990 | A1* | 5/2021 | Henry | A01B 71/08 |
| 2021/0176909 | A1* | 6/2021 | Foster | A01B 79/005 |
| 2021/0235609 | A1* | 8/2021 | Ferrari | G01S 13/885 |

OTHER PUBLICATIONS

ASAE S414.Feb. 2004 Terminology and Definitions for Agricultural Tillage Implements, https://efotg.sc.egov.usda.gov/references/public/ME/tillage_implements.pdf, 2006. (Year: 2006).*

* cited by examiner

SYSTEM AND METHOD FOR CONTROLLING THE OPERATION OF AN AGRICULTURAL IMPLEMENT

FIELD OF THE INVENTION

The present disclosure generally relates to agricultural implements and, more particularly, to a system and method for controlling the operation of an agricultural implement.

BACKGROUND OF THE INVENTION

It is well known that, to attain the best agricultural performance from a field, a farmer must cultivate the soil, typically through a tillage operation. Modern farmers perform tillage operations by pulling an agricultural implement, such as a tillage implement, behind an agricultural work vehicle, such as a tractor. For example, tillage implements generally include ground-engaging tillage tools, such as shanks, disk blades, and/or the like, supported on its frame. Each ground-engaging tool, in turn, is configured to be moved relative to the soil within the field as the tillage implement travels across the field. Such movement of the ground-engaging tools loosens and/or otherwise agitates the soil to prepare the field for subsequent planting operations.

As the tillage implement travels across the field, the implement may encounter varying field conditions. For example, the implement may encounter soil clods of various sizes that may require additional tilling to achieve a desired soil surface finish. In this respect, systems for controlling the operation of an agricultural implement based on the soil clods present within a field have been developed. While such systems work well, further improvements are needed.

Accordingly, an improved system and method for controlling the operation of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling the operation of an agricultural implement. The system includes a leveling disk gang assembly including a plurality of leveling disk blades configured to rotate relative to a surface of a field. Additionally, the system includes an imaging device configured to generate data indicative of sizes of soil clods forward or aft of the plurality of leveling disk blades relative to a direction of travel of an agricultural implement. Furthermore, the system includes an actuator configured to adjust a position of the leveling disk gang assembly within a plane defined by a longitudinal direction extending parallel to the direction of travel and a lateral direction perpendicular to the longitudinal direction. Moreover, the system includes a computing system communicatively coupled to the imaging device. The computing system is configured to determine the sizes of the soil clods based on the data generated by the imaging device. Additionally, the computing system is configured to control an operation of the actuator to adjust the position of the leveling disk gang assembly based on the determined sizes of the soil clods.

In another aspect, the present subject matter is directed to a method for controlling the operation of an agricultural implement. The method includes receiving, with a computing system, image data indicative of sizes of soil clods forward or aft of a plurality of leveling disk blades of a leveling disk gang assembly of an agricultural implement relative to a direction of travel of the agricultural implement. Additionally, the method includes determining, with the computing system, the sizes of the soil clods based on the received image data. Furthermore, the method includes controlling, with the computing system, an operation of an actuator of the agricultural implement to adjust a position of the leveling disk gang assembly within a plane defined by a longitudinal direction extending parallel to the direction of travel and a lateral direction perpendicular to the longitudinal direction based on the determined sizes of the soil clods.

In another aspect, the present subject matter is directed to an agricultural implement. The agricultural implement includes a frame and a plurality of ground-engaging shanks mounted to the frame and configured to engage the soil of a field as the agricultural implement travels across the field. Additionally, the agricultural implement includes a leveling disk gang assembly mounted to the frame and positioned aft of the plurality of ground-engaging shanks in a longitudinal direction extending parallel to a direction of travel of the agricultural implement. The leveling disk gang assembly includes a plurality of leveling disk blades configured to rotate relative to a surface of the field. Furthermore, the agricultural implement includes an imaging device configured to generate data indicative of sizes of soil clods forward or aft of the plurality of leveling disk blades relative to the direction of travel of the agricultural implement. Moreover, the agricultural implement includes an actuator configured to adjust a position of the leveling disk gang assembly within a plane defined by the longitudinal direction and a lateral direction perpendicular to the longitudinal direction. Additionally, the agricultural implement includes a computing system communicatively coupled to the imaging device. The computing system is configured to determine the sizes of the soil clods based on the data generated by the imaging device. Furthermore, the computing system is configured to control the operation of the actuator to adjust the position of the leveling disk gang assembly based on the determined sizes of the soil clods.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
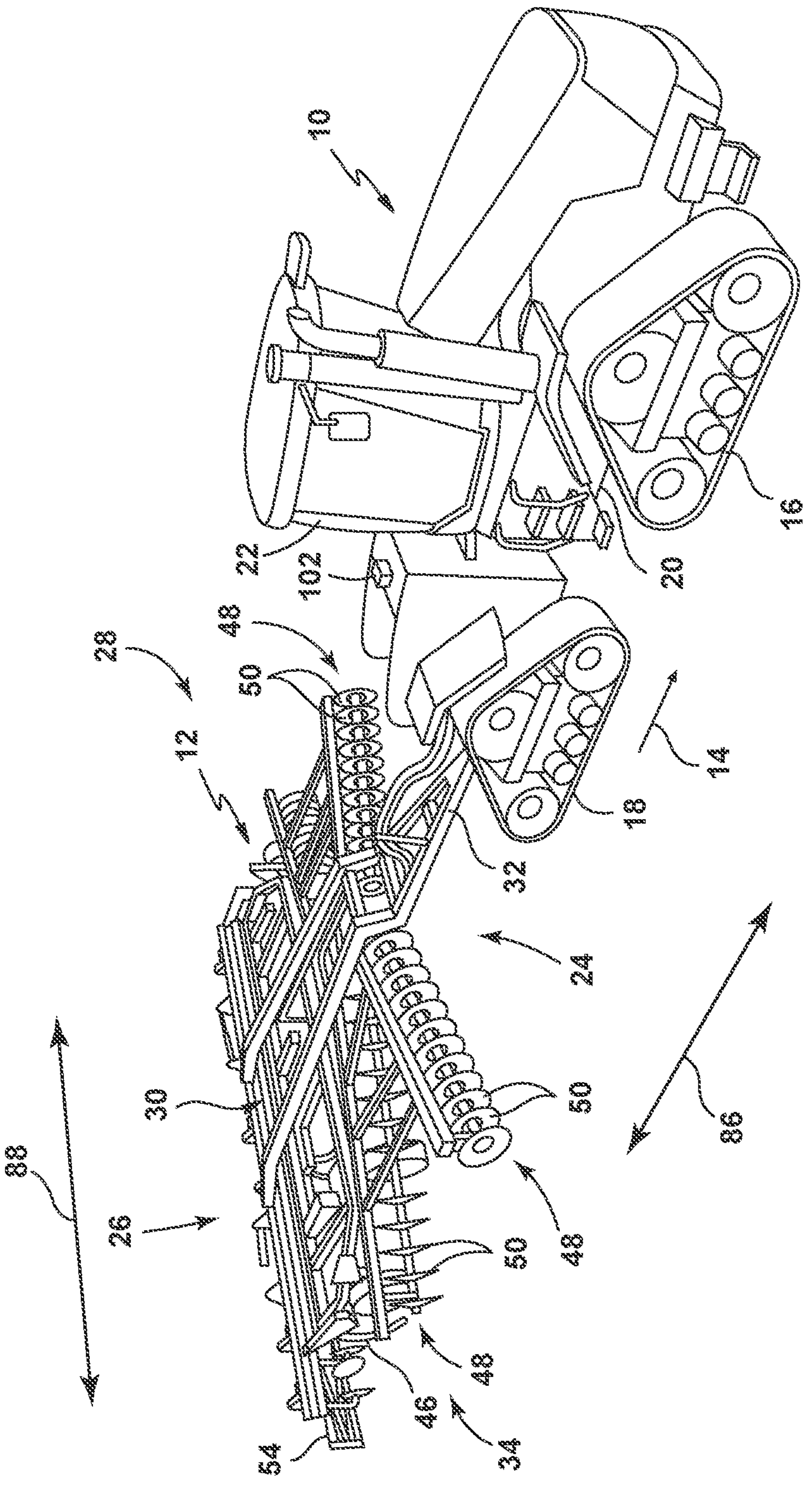
FIG. 1 illustrates a perspective view of one embodiment of an agricultural vehicle and an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for controlling the operation of an agricultural implement, such as a tillage implement. As will be described below, the agricultural implement includes a frame and a plurality of ground-engaging shanks mounted to the frame and configured to engage the soil of a field as the implement travels across the field. Additionally, the implement includes one or more leveling disk gang assemblies positioned aft of the ground-engaging shanks. Each leveling disk gang assembly, in turn, includes a plurality of leveling disk blades ganged together (e.g., along a shaft) and configured to rotate relative to the surface of the field. Additionally, the implement includes one or more actuators configured to adjust the position(s) of the leveling disk gang assembly(ies) such that, for example, an angle defined between the leveling disk gang assembly(ies) and a centerline of the implement is increased or decreased.

Furthermore, a computing system of the disclosed system is configured to control the operation of the actuator(s) to adjust the position(s) of the leveling disk gang assembly(ies) based on the sizes of the soil clods present within the field across which the implement is traveling. More specifically, the computing system is configured to receive data from one or more imaging devices supported on the implement or an associated agricultural vehicle. Such data is, in turn, indicative of the sizes of the soil clods present within an imaged portion of the field forward or aft of the leveling disk blades. As such, the computing system may determine the sizes of the soil clods based on the data received from the imaging device(s). Thereafter, the computing system may control the operation of the actuator(s) to adjust the position(s) of the leveling disk gang assembly(ies) based on the determined sizes of the soil clods.

Controlling the operation of the actuator(s) to adjust the position(s) of the leveling disk gang assembly(ies) positioned aft of the plurality of ground-engaging shanks of an agricultural implement based on soil clod size improves the operation of the implement. More specifically, the ground-engaging shanks of an implement generate soil clods upon penetration of the field surface. Some soil clods may require additional tilling to achieve a desired soil surface finish not achievable with current implement configurations. The disclosed system and method can automatically determine the sizes of the soil clods and control the operation of the actuator(s) to adjust the position(s) of the leveling disk gang assembly(ies) based on the size of the soil clods. As such, because the disclosed system can adjust the position(s) of the leveling disk gang assembly(ies) based on clod size, and thus adjust the leveling disk blade orientation, the implement is better suited to break up larger soil clods, thereby eliminating the need for additional tillage.

Figure 2:
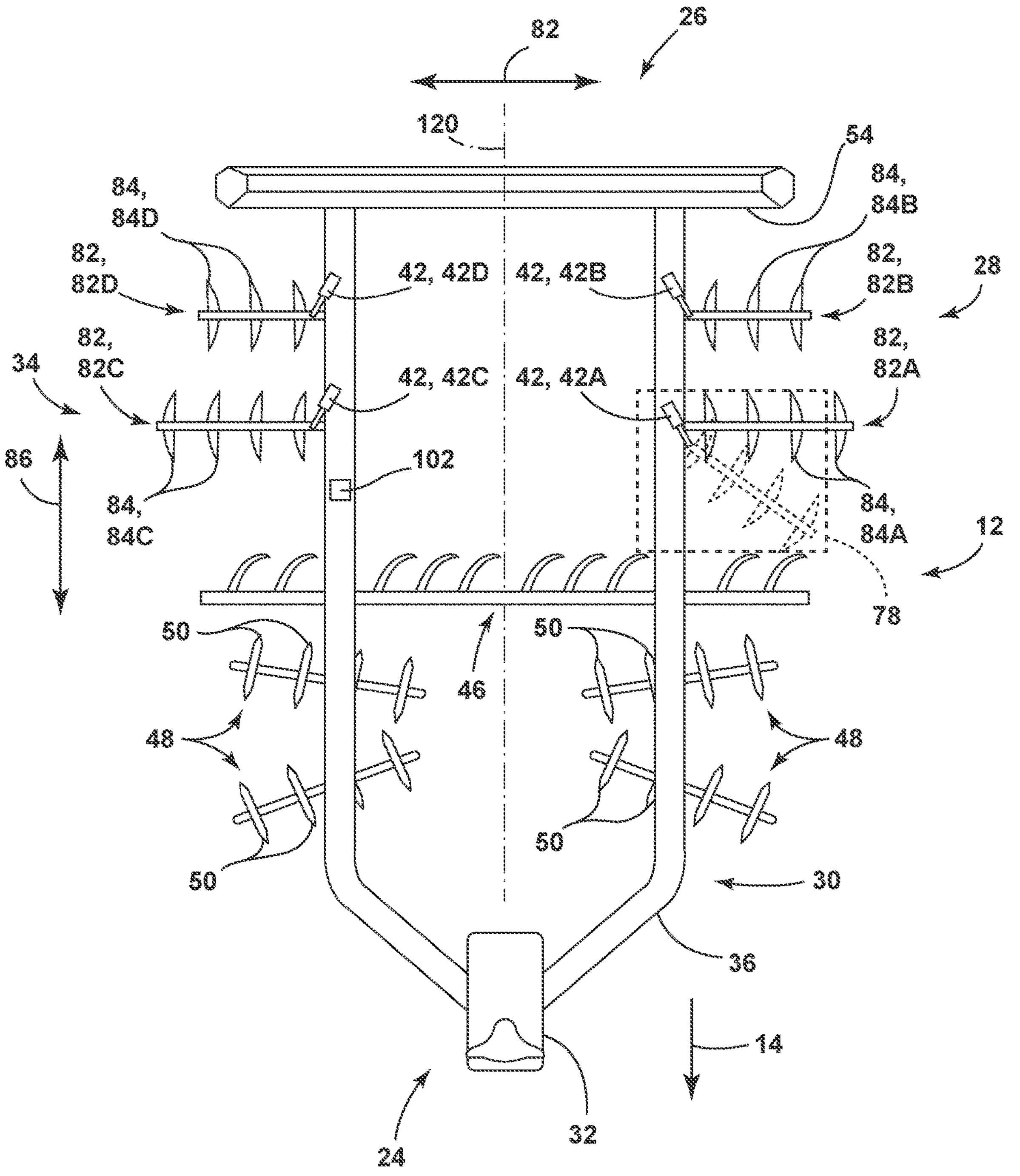
FIG. 2 illustrates a top view of one embodiment of an agricultural implement in accordance with aspects of the present subject matter.

Referring now to drawings, FIGS. 1 and 2 illustrate different views of one embodiment of an agricultural vehicle 10 and an associated agricultural implement 12 in accordance with aspects of the present subject matter. Specifically, FIG. 1 illustrates a perspective view of the agricultural vehicle 10 towing the agricultural implement 12 across a field in a travel direction (e.g., as indicated by arrow 14). FIG. 2 illustrates a top view of the embodiment of the agricultural implement 12 illustrated in FIG. 1.

As shown, the agricultural vehicle 10 is configured as an agricultural tractor and the agricultural implement 12 is configured as a tillage implement (e.g., a disk ripper). However, in other embodiments, the agricultural vehicle 10 may be configured as any other suitable agricultural or other type of work vehicle. Similarly, in other embodiments, the agricultural implement 12 may be configured as any other suitable agricultural implement configured to be towed by an agricultural vehicle.

As shown in FIG. 1, the agricultural vehicle 10 includes a pair of front track assemblies 16, a pair of rear track assemblies 18, and a frame or chassis 20 coupled to and supported by the track assemblies 16, 18. However, in other embodiments, the vehicle 10 may include wheels and tires (not shown) in addition to or in lieu of the track assemblies. An operator's cab 22 may be supported by a portion of the chassis 20 and may house various input devices for permitting an operator to control the operation of one or more components of the vehicle 10 and/or one or more components of the implement 12.

Additionally, the implement 12 may generally include a carriage frame assembly 30 configured to be towed by the vehicle 10 via a pull hitch or tow bar 32 in the travel direction 14 of the vehicle/implement 10/12. The carriage frame 30 of the implement extends between a forward end 24 and an aft end 26 along a longitudinal direction 86 parallel to the direction of travel 14. The carriage frame 30 also extends between a first side 28 and a second side 34 in a lateral direction 88 perpendicular to the longitudinal direction 86. Furthermore, the carriage frame 30 may have any suitable combination of bars, beams, and/or other structural members.

Furthermore, the carriage frame 30 may support a plurality of ground-engaging tools. In several embodiments, the various ground-engaging tools may be configured to perform an agricultural operation, such as a tillage operation, on the field across which the implement 12 is being towed. For example, in one embodiment, the carriage frame 30 may be configured to support various harrow gangs or sets 48 of harrow blades 50. Specifically, the harrow blades 50 are spaced apart from each other along the length of the corresponding harrow gang 48 and configured to engage or rotate relative to the soil within the field as the implement 12 travels across the field in the travel direction 14. In addition, the various harrow gangs 48 of harrow blades 50 may be oriented at an angle relative to the travel direction 14 of the implement 12 to promote more effective tilling of the soil.

Additionally, the carriage frame 30 supports a plurality of ground-engaging shanks 46. In such an embodiment, the shanks 46 are configured to till or otherwise engage the soil as the implement 12 is towed across the field. Additionally, the plurality of ground-engaging shanks 46 may be supported by the carriage frame 30 aft of the harrow gangs 48 relative to the direction of travel 14. During operations, the shanks 46 may generate soil clods of various sizes as the shanks 46 penetrate the soil.

Moreover, as shown in FIG. 2, the carriage frame 30 supports one or more leveling disk gang assemblies 82 positioned aft of the plurality of ground-engaging shanks 46. Each leveling disk gang assembly 82 includes a plurality of leveling disk blades 84. For example, as shown in FIG. 2, the carriage frame 30 supports four leveling disk gang assemblies 82 positioned aft of the plurality of ground-engaging shanks 46. Each leveling disk gang assembly 82 includes a plurality of leveling disk blades 84. Moreover, the leveling disk blades 84 are configured to rotate relative to the soil within the field as the implement 12 travels across the field in the travel direction 14 to break up the soil (e.g., soil clods). However, it should be appreciated that the carriage frame 30 may support any suitable number of leveling disk gang assemblies 82. For example, the carriage frame 30 may support a single leveling disk gang assembly 82.

Furthermore, as shown in FIG. 2, the leveling disk gang assembly(ies) 82 extends along the lateral direction 88 away from an implement centerline 120. The implement centerline 120, in turn, extends parallel to the longitudinal direction 86 and between the first side 28 and the second side 34 of the implement 12. Additionally, as shown in FIG. 2, some of the leveling disk gang assemblies 82 are positioned aft of the other leveling disk gang assemblies 82.

Moreover, the carriage frame 30 may be configured to support a plurality of rolling (or crumbler) basket assemblies 54. The rolling basket assemblies 54 may be supported by the carriage frame 30 aft of the leveling disk gang assembly (ies) 82.

It should be appreciated that the carriage frame 30 may support any other suitable ground-engaging tools. For example, the carriage frame 30 may support a plurality of tines, spikes, and/or the like.

Furthermore, as shown in FIG. 2, the agricultural implement 12 may include one or more actuators 42. The actuator (s) 42 may be configured to adjust a position of the leveling disk gang assembly(ies) 82 within a plane 78 defined by the longitudinal direction 86 and the lateral direction 88. For example, as shown in FIG. 2, the implement 12 includes four actuators 42. Each actuator 42 is coupled between the respective leveling disk gang assembly 82 and the carriage frame 30 and configured to adjust the position of each leveling disk gang assembly 82 within the plane 78 defined by the longitudinal direction 86 and the lateral direction 88. As such, when the position(s) of the leveling disk gang assembly(ies) 82 are adjusted, an angle 52 defined between the leveling disk gang assembly(ies) 82 and the centerline 120 of the implement 12 increases or decreases. An increase in the angle 52 allows the leveling disk blades 84 of the implement 12 to be more aggressively positioned to break up soil clods. However, an increase in the angle 52 may result in an increased implement drag load on the vehicle 10, decrease in fuel efficiency of the vehicle 10, and/or the like. Alternatively, a decrease in the angle 52 allows the leveling disk blades 84 of the implement 12 to be less aggressively positioned to break up soil clods but may result in a decreased implement drag load on the vehicle 10, increase in fuel efficiency of the vehicle 10, and/or the like.

Additionally, it should be appreciated that the actuator(s) 42 may be configured as any suitable actuator(s) configured to adjust the position of the leveling disk gang assembly(ies) 82. For example, the actuator(s) 42 may be configured as a hydraulic or pneumatic actuator(s) and/or the like.

Moreover, the agricultural implement 12 and/or the agricultural vehicle 10 may include one or more imaging devices 102 coupled thereto and/or supported thereon. The imaging devices(s) 102 is configured to generate data indicative of sizes of soil clods present within a portion of the field forward or aft of the plurality of leveling disk blades 84 relative to the direction of travel 14 of the implement 12. Such data may subsequently be used to control the operation of the actuator(s) 42 to adjust the position of the leveling disk gang assembly(ies) 82 of the implement 12.

In general, the imaging device(s) 102 may correspond to any suitable imaging device(s) configured to generate data indicative of the sizes of the soil clods. In several embodiments, the imaging device(s) 102 may be configured as a light detection and ranging (LiDAR) sensor(s). For example, the LiDAR sensor(s) may emit a light pulse and/or a light beam and receive reflections of the emitted light pulse and/or light beam. However, in alternative embodiments, the imaging device(s) 102 may be configured as any other suitable imaging device(s) for generating data indicative of the size of the soil clods. For example, the imaging device(s) 102 may be configured as a camera(s), radar(s), and/or the like.

Furthermore, the implement 12 and/or the vehicle 10 may include any number of imaging devices 102 provided at any suitable location that allows data indicative of the sizes of the soil clods to be generated within the portion(s) of the field forward or aft of the plurality(ies) of disk blades 84 relative to the direction of travel 14 of the implement 12 as the implement 12 and the vehicle 10 traverse the field. In this respect, FIG. 2 illustrates example locations for mounting the imaging device(s) 102 for generating data indicative of the sizes of the soil clods within the portion(s) of the field forward or aft of the plurality(ies) of disk blades 84. For example, the imaging device(s) 102 is mounted on the carriage frame 30 of the implement 12. In this respect, the imaging device(s) 102 may generate data indicative of the sizes of the soil clods within the portion(s) of the field forward or aft of the plurality(ies) of disk blades 84. However, in alternative embodiments, the imaging device(s) 102 may be installed at any other suitable location(s) that allows the device(s) to generate data indicative of the sizes of the soil clods within the portion(s) of the field forward or aft of the plurality(ies) of disk blades 84.

Figure 3:
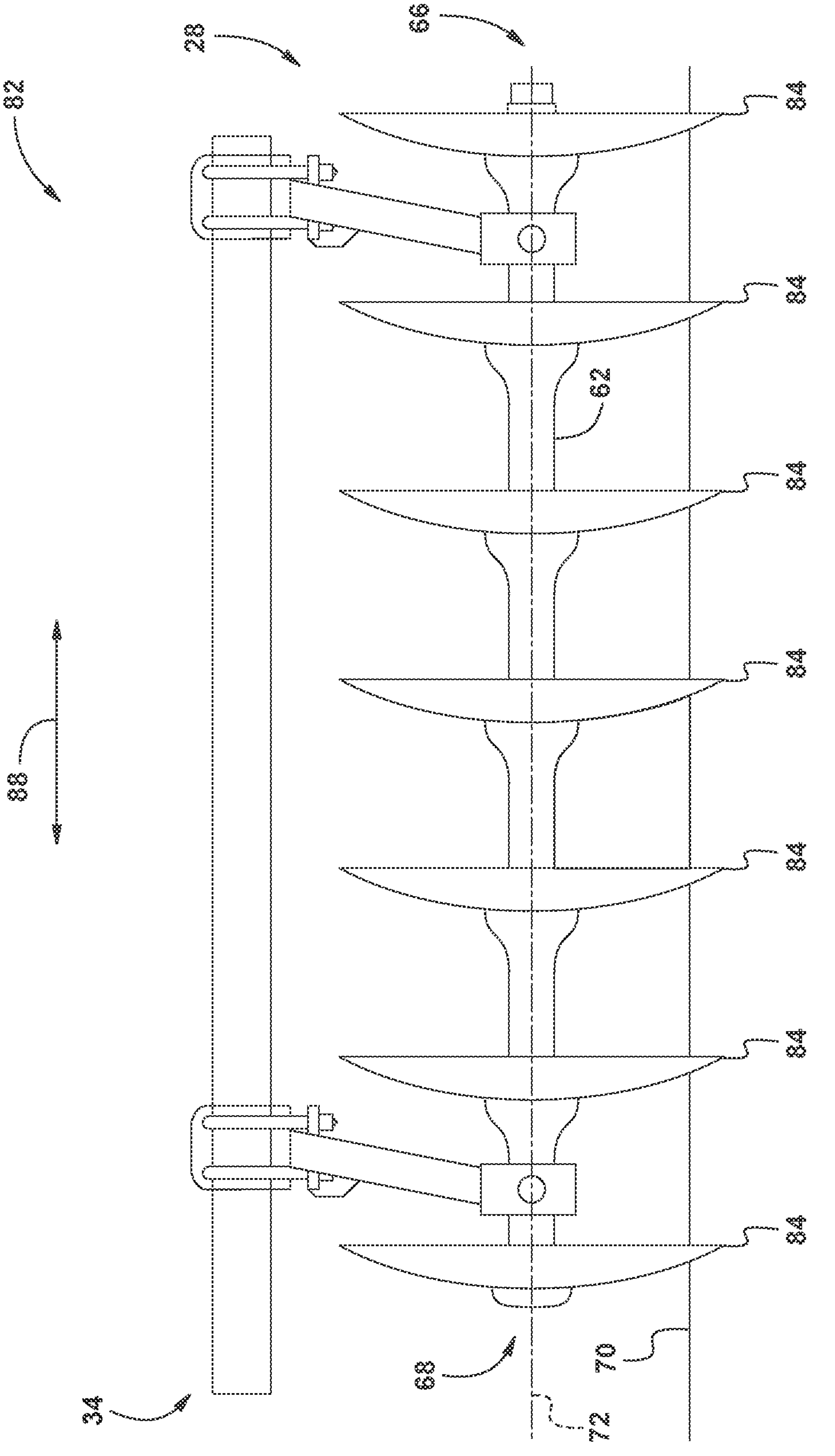
FIG. 3 illustrates a front view of one embodiment of a leveling disk gang assembly of an agricultural implement in accordance with aspects of the present subject matter.

Referring now to FIG. 3, a front view of one embodiment of the leveling disk gang assembly 82 of the agricultural implement 12 illustrated in FIG. 2 is illustrated.

As shown in FIG. 3, each leveling disk gang assembly 82 includes a leveling disk gang shaft 62 that extends between a first end 66 and a second end 68 along the lateral direction 88. Each leveling disk blade 84 of each of the pluralities of leveling disk blades 84 is coupled to the respective leveling disk gang shaft 62 and spaced apart from the other leveling disk blades 84 along the lateral direction 88. In this respect, as the implement 12 travels across a field, the leveling disk blades 84 penetrate the soil surface (e.g., as indicated by line 70) of the field and rotate about an axis of rotation (e.g., as indicated by dashed line 72) relative to the soil within the field to break up the soil (e.g., soil clods).

Figure 4:
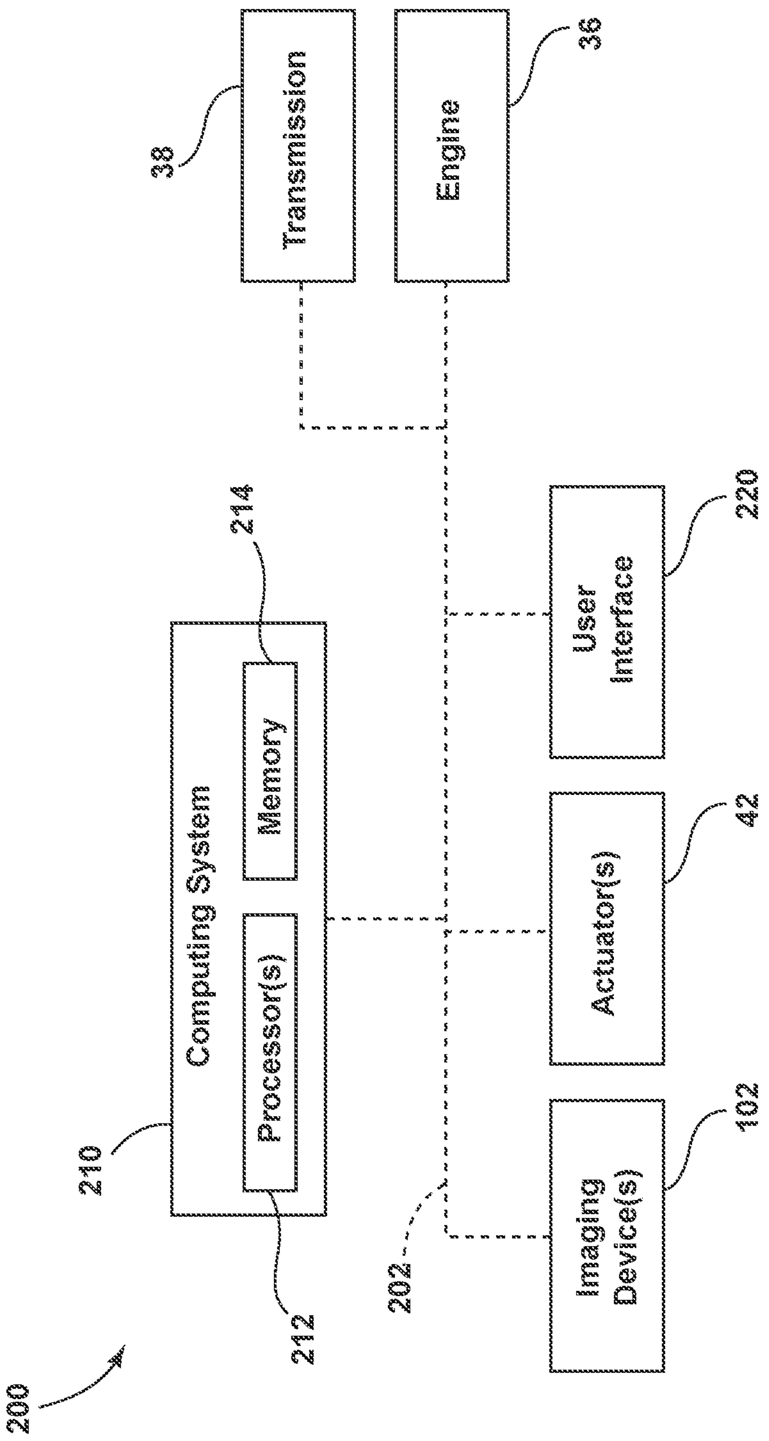
FIG. 4 illustrates a schematic view of one embodiment of a system for controlling the operation of an agricultural implement in accordance with aspects of the present subject matter.

Referring now to FIG. 4, a schematic view of one embodiment of a system 200 for controlling the operation of an agricultural implement is illustrated in accordance with aspects of the present subject matter. In general, the system 200 will be described herein with reference to the agricultural vehicle 10 and the implement 12 described above with reference to FIGS. 1-3. However, it should be appreciated that the disclosed system 200 may generally be utilized with agricultural vehicles having any suitable vehicle configuration and/or implements have any suitable implement configuration.

As shown in FIG. 4, the system 200 includes a computing system 210 communicatively coupled to one or more components of the implement 12, the agricultural vehicle 10, and/or the system 200 to allow the operation of such components to be electronically or automatically controlled by the computing system 210. For instance, the computing system 210 may be communicatively coupled to the imaging device(s) 102 via a communicative link 202. As such, the computing system 210 may be configured to receive image data from the imaging device(s) 102 that is indicative of the sizes of the soil clods within a portion of the field forward or aft of the plurality of disk blades 84 relative to the direction of travel 14 of the implement 12. Moreover, the computing system 210 may be communicatively coupled to the actuator(s) 42 via the communicative link 202. As such, the computing system 210 may be configured to control the operation of the actuator(s) 42 to adjust the position(s) of the leveling disk gang assembly 82 based on the determined sizes of the soil clods. Furthermore, the computing system 210 may be communicatively coupled to the engine 36 and/or the transmission 38 of the agricultural vehicle 10 via the communicative link 202. In this respect, the computing system 210 may be configured to control the operation of the engine 36 and/or the transmission 38 to adjust the ground speed at which the agricultural vehicle 10 and, thus, the implement 12 travels across the field. In addition, the computing system 210 may be communicatively coupled to any other suitable components of the implement 12, the agricultural vehicle 10, and/or the system 200.

In general, the computing system 210 may comprise any suitable processor-based device known in the art, such as a given controller or computing device or any suitable combination of controllers or computing devices. Thus, in several embodiments, the computing system 210 may include one or more processor(s) 212 and associated memory device (s) 214 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 of the computing system 210 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 214 may generally be configured to store suitable computer-readable instructions that, when implemented by the processor(s) 212, configure the computing system 210 to perform various computer-implemented functions, such as one or more aspects of the methods and algorithms that will be described herein. In addition, the computing system 210 may also include various other suitable components, such as a communications circuit or module, one or more input/output channels, a data/control bus and/or the like.

It should be appreciated that the computing system 210 may correspond to an existing computing system(s) of the implement 12 and/or the agricultural vehicle 10, itself, or the computing system 210 may correspond to a separate processing device. For instance, in one embodiment, the computing system 210 may form all or part of a separate plug-in module that may be installed in association with the implement 12 and/or the agricultural vehicle 10 to allow for the disclosed systems to be implemented without requiring additional software to be uploaded onto existing control devices of the implement 12 and/or the agricultural vehicle 10.

Furthermore, it should also be appreciated that the functions of the computing system 210 may be performed by a single processor-based device or may be distributed across any number of processor-based devices, in which instance such devices may be considered to form part of the computing system 210. For instance, the functions of the computing system 210 may be distributed across multiple application-specific controllers or computing devices, such as a navigation controller, an engine computing controller, a transmission controller, an implement controller and/or the like.

In addition, the system 200 may also include a user interface 220. More specifically, the user interface 220 may be configured to provide feedback, such as feedback associated with the determined sizes of the soil clods, to the operator. As such, the user interface 220 may include one or more feedback devices (not shown), such as display screens, speakers, warning lights, and/or the like, which are configured to provide feedback from the computing system 210 to the operator. As such, the user interface 220 may, in turn, be communicatively coupled to the computing system 210 via the communicative link 202 to permit the feedback to be transmitted from the computing system 210 to the user interface 220. Furthermore, some embodiments of the user interface 220 may include one or more input devices, such as touchscreens, keypads, touchpads, knobs, buttons, sliders, switches, mice, microphones, and/or the like, which are configured to receive inputs from the operator. In one embodiment, the user interface 220 may be mounted or otherwise positioned within the operator's cab 22 of the agricultural vehicle 10. However, in alternative embodiments, the user interface 220 may mounted at any other suitable location.

Figure 5:
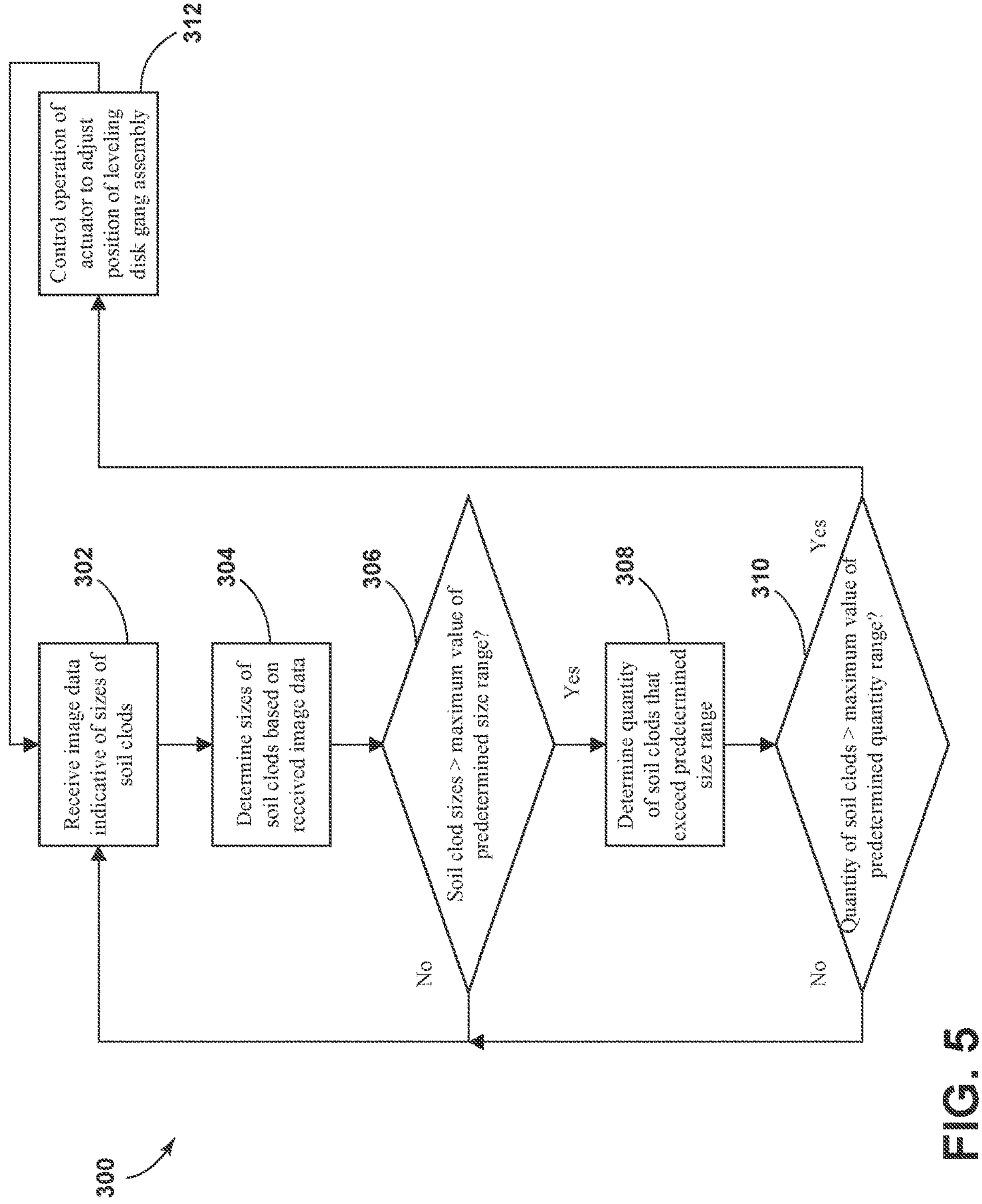
FIG. 5 illustrates a flow diagram of one embodiment of control logic for controlling the operation of an agricultural implement in accordance with aspects of the present subject matter.

Referring now to FIG. 5, a flow diagram of one embodiment of control logic 300 that may be executed by the computing system 210 (or any other suitable computing system) for controlling the operation of an agricultural implement is illustrated in accordance with aspects of the present subject matter. Specifically, the control logic 300 shown in FIG. 5 is representative of steps of one embodiment of an algorithm that can be executed to control the operation of an agricultural implement to adjust the positions of the leveling disk gang assemblies based on soil clod size. Thus, in several embodiments, the control logic 300 may be advantageously utilized in association with a system installed on or forming part of an agricultural implement to allow for real-time control of the operation of the implement without requiring substantial computing resources and/or processing time. However, in other embodiments, the control logic 300 may be used in association with any other suitable system, application, and/or the like for controlling the operation of an agricultural implement.

As shown in FIG. 5, at (302), the control logic 300 includes receiving image data indicative of sizes of soil clods present within a portion of a field forward or aft of a plurality of leveling disk blades of an agricultural implement relative to a direction of travel of the agricultural implement. Specifically, as mentioned above, in several embodiments, the computing system 210 may be communicatively coupled to the imaging device(s) 102 via the communicative link 202. In this respect, as the implement 12 travels across the field to perform an agricultural operation (e.g., a tillage operation) thereon, the computing system 210 may receive image data from the imaging device(s) 102. Such data may, in turn, be indicative of the sizes of the soil clods within the portion(s) of the field forward or aft of the plurality(ies) of leveling disk blades 84.

Additionally, at (304), the control logic 300 includes determining the sizes of the soil clods based on the received image data. In this respect, in several embodiments, the computing system 210 may be configured to analyze the image data received at (302) to determine the sizes of the soil clods. For example, the computing system 212 may access a look-up table, equations, and/or the like stored within its memory device(s) 214 that correlates the image data received at (302) to the corresponding sizes of the soil clods. As will be described below, the determined sizes of the soil clods will be used to control an operation of the actuator(s) 42 to adjust the position(s) of the leveling disk gang assembly(ies) 82 accordingly.

Furthermore, as shown in FIG. 5, at (306), the control logic 300 includes comparing the determined sizes of the soil clods to a predetermined size range. During agricultural operations, the agricultural implement 12 may fail to break up soil clods exceeding the predetermined size range to provide a selected field surface finish without adjusting the position(s) of the leveling disk gang assembly(ies) 82. As such, in several embodiments, the computing system 210 may be configured to compare the sizes of the soil clods determined at (304) to the predetermined size range. The predetermined size range may, in turn, be a maximum size range in which the implement 12 would not struggle to break up soil clods. When the determined sizes of the soil clods exceed a maximum value of the predetermined size range, the control logic 300 proceeds to (308). When the determined sizes of the soil clods fall below a minimum value of the predetermined size range or are within the predetermined size range, the control logic 300 returns to (302).

Moreover, at (308), the control logic 300 includes determining a quantity of the soil clods that exceed the predetermined size range. In this respect, in several embodiments, the computing system 210 may be configured to determine the quantity of the soil clods having sizes determined at (304) that exceed the predetermined size range.

Additionally, at (310), the control logic 300 includes comparing the determined quantity of soil clods to a predetermined quantity range. As mentioned above, during agricultural operations, the implement 12 may fail to break up soil clods exceeding the predetermined size range to provide a selected field surface finish, especially when the quantity of soil clods that exceed the predetermined size range exceeds the predetermined quantity range, without adjusting the position(s) of the leveling disk gang assembly(ies) 82. As such, in several embodiments, the computing system 210 may be configured to compare the quantity of soil clods determined at (308) to the predetermined quantity range. The predetermined quantity range may be a maximum quantity range in which the implement 12 would still provide a selected field surface finish without adjusting the angle 52. When the determined quantity of soil clods exceeds a maximum value of the predetermined quantity range, the control logic 300 proceeds to (312). When the determined quantity of soil clods falls below a minimum value of the predetermined quantity range or is within the predetermined quantity range, the control logic 300 returns to (302).

Furthermore, as shown in FIG. 5, at (312), the control logic 300 includes controlling the operation of the actuator to adjust the position of the leveling disk gang assembly when the determined quantity falls outside of the predetermined quantity range. In this respect, in several embodiments, the computing system 210 may be configured to control the operation of the actuator(s) 42 to adjust the position(s) of the leveling disk gang assembly(ies) 82 when the determined quantity falls outside of the predetermined quantity range.

In certain instances, the implement 12 may be better suited to break up the soil clods to provide a better field surface finish. For example, the angle 52 defined between the leveling disk gang assembly(ies) 82 and the centerline 120 of the implement may be increased when the determined quantity of the soil clods that exceed the predetermined size threshold range exceeds the predetermined quantity range. As such, the computing system 210 may be configured to control the operation of the actuator(s) 42 to adjust the position(s) of the leveling disk gang assembly(ies) 82 such that the angle 52 is increased.

In other instances, the implement 12 may be better suited to decrease the drag load applied to the vehicle 10, increase the fuel efficiency of the vehicle 10, and/or the like. For example, the angle 52 may be decreased when the determined quantity of the soil clods falls below the predetermined quantity range. As such, the computing system 210 may be configured to control the operation of the actuator(s) 42 to adjust the position(s) of the leveling disk gang assembly(ies) 82 such that the angle 52 is decreased. Upon completion of (312), the control logic 300 returns to (302).

In some alternative embodiments, the control logic 300 may include initiating one or more control actions when it is determined that the sizes of the soil clods fall outside of the predetermined size range. For example, the computing system 210 may be configured to initiate a notification to an operator of the agricultural vehicle 10 and/or agricultural implement 12 that the sizes of the soil clods fall outside of the predetermined size range. Specifically, the computing system 210 may be configured to transmit instructions to the user interface 220 (e.g., via the communicative link 202) instructing the user interface 220 to initiate a notification to the operator of the agricultural vehicle 10 and/or implement 12 (e.g., by causing a visual notification or indicator to be presented to the operator) indicating that the sizes of the soil clods fall outside of the predetermined size range.

Alternatively, or additionally, the computing system 210 may be configured to automatically adjust the ground speed at which the agricultural vehicle 10 and/or implement 12 is traveling across the field when it is determined that the sizes of the soil clods fall outside of the predetermined size range. Specifically, the computing system 210 may be configured to transmit instructions to the engine 36 and/or the transmission 38 (e.g., via the communicative link 202) instructing the engine 36 and/or the transmission 38 to adjust their operation. For example, the computing system 210 may instruct the engine 36 to vary its power output and/or the transmission 38 to upshift or downshift to increase or decrease the ground speed and/or stop/halt movement of the agricultural vehicle 10 and/or the implement 12. However, in alternative embodiments, the computing system 210 may be configured to transmit instructions to any other suitable components (e.g., braking actuators) of the agricultural vehicle 10 and/or the implement 12 such that the ground speed of the agricultural vehicle 10 and/or the implement 12 is adjusted. Furthermore, it should be appreciated that any other suitable parameter(s) the agricultural vehicle 10 and/or the implement 12 may be adjusted when it is determined that sizes of the soil clods fall outside of the predetermined size range.

Figure 6:
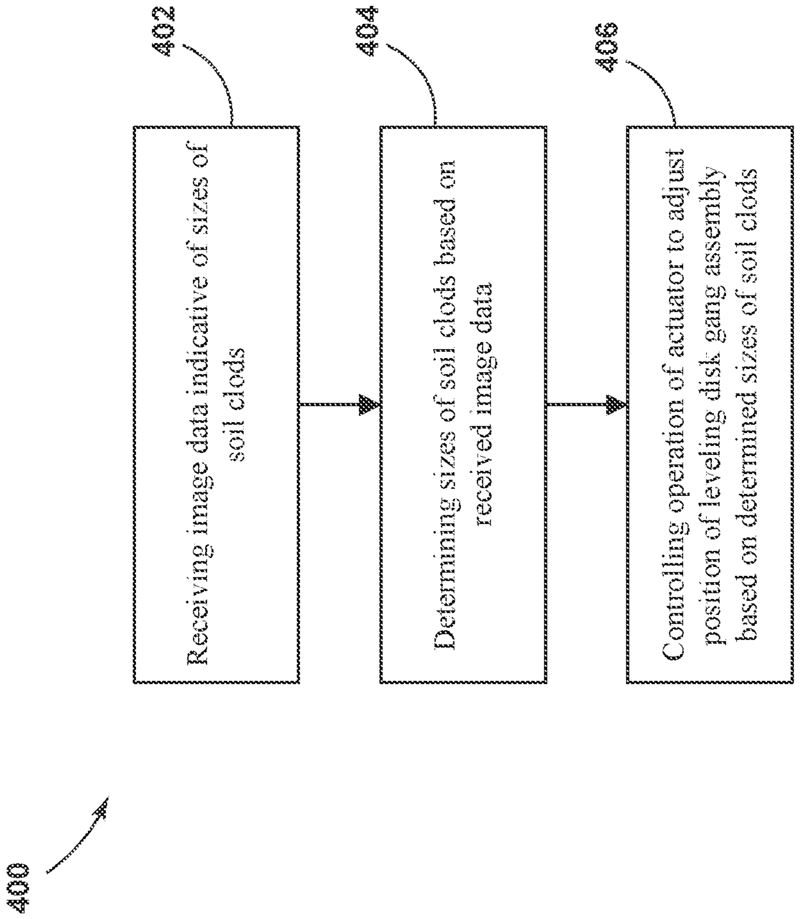
FIG. 6 illustrates a flow diagram of one embodiment of a method for controlling the operation of an agricultural implement in accordance with aspects of the present subject matter.

Referring now to FIG. 6, a flow diagram of one embodiment of a method 400 for controlling the operation of an agricultural implement is illustrated in accordance with aspects of the present subject matter. In general, the method 400 will be described herein with reference to the agricultural implement 12 and the agricultural vehicle 10 shown in FIGS. 1-3 and the system 200 described with reference to FIGS. 4 and 5. However, it should be appreciated that the disclosed method 400 may be implemented with agricultural vehicles and/or agricultural implements having any other suitable configurations and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 6, at (402), the method 400 may include receiving image data indicative of sizes of soil clods within a portion of a field forward or aft of a plurality of disk blades of an agricultural implement relative to a direction of travel of the agricultural implement. As such, the computing system 210 may be configured to receive the image data indicative of the sizes of the soil clods within the portion(s) of the field forward or aft of the plurality(ies) of disk blades 84 from the imaging device(s) 102.

Additionally, at (404), the method 400 may include determining the sizes of the soil clods based on the received image data. For instance, as indicated above, in several embodiments, the computing system 210 may be configured to determine the sizes of the soil clods based on the received image data.

Moreover, at (406), the method 400 may include controlling an operation of an actuator of the agricultural implement to adjust a position of the leveling disk gang assembly within a plane defined by a longitudinal direction extending parallel to the direction of travel and a lateral direction perpendicular to the longitudinal direction based on the determined sizes of the soil clods. For instance, as indicated above, in several embodiments, the computing system 210 may be configured to control the operation of the actuator(s) 42 of the agricultural implement 12 to adjust the position(s) of the leveling disk gang assembly(ies) 82 within the plane 78 defined by the longitudinal direction 86 and the lateral direction 88 based on the determined sizes of the soil clods.

It is to be understood that the steps of the control logic 300 and the method 400 are performed by the computing system 210 upon loading and executing software code or instructions which are tangibly stored on one or more tangible computer readable media, such as one or more magnetic media (e.g., a computer hard drive(s)), one or more optical media (e.g., an optical disc(s)), solid-state memory (e.g., flash memory), and/or other storage media known in the art. Thus, any of the functionality performed by the computing system 210 described herein, such as the control logic 300 and the method 400, is implemented in software code or instructions which are tangibly stored on one or more tangible computer readable media. The computing system 210 loads the software code or instructions via a direct interface with the one or more computer readable media or via a wired and/or wireless network. Upon loading and executing such software code or instructions by the computing system 210, the computing system 210 may perform any of the functionality of the computing system 210 described herein, including any steps of the control logic 300 and the method 400 described herein.

The term "software code" or "code" used herein refers to any instructions or set of instructions that influence the operation of a computing system, such as one or more computers or one or more controllers. They may exist in a computer-executable form, such as machine code, which is the set of instructions and data directly executed by a computing system's central processing unit(s) or by a controller(s), a human-understandable form, such as source code, which may be compiled in order to be executed by a computing system's central processing unit(s) or by a controller(s), or an intermediate form, such as object code, which is produced by a compiler. As used herein, the term "software code" or "code" also includes any human-understandable computer instructions or set of instructions (e.g., a script), that may be executed on the fly with the aid of an interpreter executed by a computing system's central processing unit(s) or by a controller(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A system for controlling the operation of an agricultural implement, the system comprising:

- an agricultural implement, comprising:
  - a plurality of ground-engaging shanks configured to engage soil of a field; and
  - a leveling disk gang assembly positioned aft of the plurality of ground-engaging shanks in a longitudinal direction extending parallel to a direction of travel of the agricultural implement, the leveling disk gang assembly including a plurality of leveling disk blades configured to rotate relative to a surface of the field;
- an imaging device configured to generate data indicative of sizes of soil clods present within a portion of a field forward or aft of the plurality of leveling disk blades relative to the direction of travel of the agricultural implement;
- an actuator configured to adjust a position of the leveling disk gang assembly within a plane defined by a longitudinal direction extending parallel to the direction of travel and a lateral direction perpendicular to the longitudinal direction; and
- a computing system communicatively coupled to the imaging device, the computing system configured to:

determine the sizes of the soil clods based on the data generated by the imaging device;

compare the determined sizes of the soil clods to a predetermined size range; and control an operation of the actuator to adjust the position of the leveling disk gang assembly forward or backward within the plane defined by the longitudinal direction and the lateral direction between a lateral position and a forward oblique position relative to a centerline of the agricultural implement parallel to the longitudinal direction when the determined sizes of the soil clods fall outside of the predetermined size range.

2. The system of claim 1, wherein, when controlling the operation of the actuator, the computing system is further configured to:

control the operation of the actuator to adjust the position of the leveling disk gang assembly forward within the plane defined by the longitudinal direction and the lateral direction from the lateral position to the forward oblique position when the determined sizes of the soil clods exceed a maximum value of the predetermined size range.

3. The system of claim 1, wherein, when controlling the operation of the actuator, the computing system is further configured to:

control the operation of the actuator to adjust the position of the leveling disk gang assembly backward within the plane defined by the longitudinal direction and the lateral direction from the forward oblique position to the lateral position when the determined sizes of the soil clods fall below a minimum value of the predetermined size range.

4. The system of claim 1, wherein, when controlling the operation of the actuator, the computing system is further configured to:

determine a quantity of the soil clods that exceed a maximum value of the predetermined size range;

compare the determined quantity to a predetermined quantity range; and control the operation of the actuator to adjust the position of the leveling disk gang assembly forward or backward within the plane defined by the longitudinal direction and the lateral direction between the lateral position and the forward oblique position when the determined quantity falls outside of the predetermined quantity range.

5. The system of claim 4, wherein, when controlling the operation of the actuator, the computing system is further configured to:

control the operation of the actuator to adjust the position of the leveling disk gang assembly forward within the plane defined by the longitudinal direction and the lateral direction from the lateral position to the forward oblique position when the determined quantity that exceeds the predetermined size range exceeds a maximum value of the predetermined quantity range.

6. The system of claim 4, wherein, when controlling the operation of the actuator, the computing system is further configured to:

control the operation of the actuator to adjust the position of the leveling disk gang assembly backward within the plane defined by the longitudinal direction and the lateral direction from the forward oblique position to the lateral position when the determined quantity that exceeds the predetermined size range falls below a minimum value of the predetermined quantity range.

7. The system of claim 1, wherein the imaging device is configured as a light detection and ranging (LiDAR) sensor.

8. The system of claim 1, wherein the computing system is further configured to:

initiate notification of an operator of the agricultural implement when the determined sizes of the soil clods fall outside of the predetermined size range.

9. A method for controlling the operation of an agricultural implement, the method comprising:

receiving, with a computing system, image data indicative of sizes of soil clods present within a portion of a field forward or aft of a plurality of leveling disk blades of a leveling disk gang assembly of an agricultural implement relative to a direction of travel of the agricultural implement, the leveling disk gang assembly positioned aft of a plurality of ground-engaging shanks of the agricultural implement relative to the direction of travel of the agricultural implement;

determining, with the computing system, the sizes of the soil clods based on the received image data;

comparing, with the computing system, the determined sizes of the soil clods to a predetermined size range; and controlling, with the computing system, an operation of an actuator of the agricultural implement to adjust a position of the leveling disk gang assembly forward or backward within a plane defined by a longitudinal direction extending parallel to the direction of travel and a lateral direction perpendicular to the longitudinal direction between a lateral position and a forward oblique position relative to a centerline of the agricultural implement parallel to the longitudinal direction when the determined sizes of the soil clods fall outside of the predetermined size range.

10. The method of claim 9, wherein, when controlling the operation of the actuator, the method further comprises:

controlling, with the computing system, the operation of the actuator to adjust the position of the leveling disk gang assembly forward within the plane defined by the longitudinal direction and the lateral direction from the lateral position to the forward oblique position when the determined sizes of the soil clods exceed a maximum value of the predetermined size range.

11. The method of claim 9, wherein, when controlling the operation of the actuator, the method further comprises:

controlling, with the computing system, the operation of the actuator to adjust the position of the leveling disk gang assembly backward within the plane defined by the longitudinal direction and the lateral direction from the forward oblique position to the lateral position when the determined sizes of the soil clods fall below a minimum value of the predetermined size range.

12. The method of claim 10, wherein, when controlling the operation of the actuator, the method further comprises:

determining, with the computing system, a quantity of the soil clods that exceed the predetermined size range;

comparing, with the computing system, the determined quantity to a predetermined quantity range; and controlling, with the computing system, the operation of the actuator to adjust the position of the leveling disk gang assembly forward or backward within the plane defined by the longitudinal direction and the lateral direction between the lateral position and the forward oblique position when the determined quantity falls outside of the predetermined quantity range.

13. The method of claim 12, wherein, when controlling the operation of the actuator, the method further comprises:

controlling, with the computing system, the operation of the actuator to adjust the position of the leveling disk gang assembly forward within the plane defined by the longitudinal direction and the lateral direction from the lateral position to the forward oblique position when the determined quantity that exceeds the predetermined size range exceeds a maximum value of the predetermined quantity range.

14. The method of claim 12, wherein, when controlling the operation of the actuator, the method further comprises:

controlling, with the computing system, the operation of the actuator to adjust the position of the leveling disk gang assembly backward within the plane defined by the longitudinal direction and the lateral direction from forward oblique position to the lateral position when the determined quantity that exceeds the predetermined size range falls below a minimum value of the predetermined quantity range.

15. The method of claim 9, further comprising:

initiating, with the computing system, notification of an operator of the agricultural implement when the determined sizes of the soil clods fall outside of the predetermined size range.

16. An agricultural implement, comprising:

a frame;

a plurality of ground-engaging shanks mounted to the frame and configured to engage soil of a field as the agricultural implement travels across the field;

a leveling disk gang assembly mounted to the frame and positioned aft of the plurality of ground-engaging shanks in a longitudinal direction extending parallel to a direction of travel of the agricultural implement, the leveling disk gang assembly including a plurality of leveling disk blades configured to rotate relative to a surface of the field;

an imaging device configured to generate data indicative of sizes of soil clods present within a portion of the field forward or aft of the plurality of leveling disk blades relative to the direction of travel of the agricultural implement;

an actuator configured to adjust a position of the leveling disk gang assembly within a plane defined by the longitudinal direction and a lateral direction perpendicular to the longitudinal direction; and a computing system communicatively coupled to the imaging device, the computing system configured to:

determine the sizes of the soil clods based on the data generated by the imaging device;

compare the determined sizes of the soil clods to a predetermined size range; and control an operation of the actuator to adjust the position of the leveling disk gang assembly forward or backward within the plane defined by the longitudinal direction and the lateral direction between a lateral position and a forward oblique position relative to a centerline of the agricultural implement parallel to the longitudinal direction when the determined sizes of the soil clods fall outside of the predetermined size range.

17. The agricultural implement of claim 16, wherein the imaging device is configured as a light detection and ranging (LiDAR) sensor.

18. The system of claim 1, wherein:

a field of view of the imaging device is directed at a portion of the field behind the plurality of ground-engaging shanks relative to the direction of travel of the agricultural implement so that the imaging device generates data indicative of the sizes of the soil clods present within the portion of the field behind the plurality of ground-engaging shanks; and determining the sizes of the soil clods comprises determining the sizes of the soil clods within the portion of the field behind the plurality of ground-engaging shanks.

19. The system of claim 1, wherein:

a field of view of the imaging device is directed at a portion of the field between the plurality of ground-engaging shanks and the plurality of leveling disk blades of the leveling disk gang so that the imaging device generates data indicative of the sizes of the soil clods present within the portion of the field between the plurality of ground-engaging shanks and the plurality of leveling disk blades of the leveling disk gang; and determining the sizes of the soil clods comprises determining the sizes of the soil clods within the portion of the field between the plurality of ground-engaging shanks and the plurality of leveling disk blades of the leveling disk gang.

* * * * *